April 21, 1970 E. C. WALSH 3,507,447
ADDING MACHINE ADAPTED TO BE HELD IN ONE HAND
Filed Aug. 5, 1968 7 Sheets-Sheet 1

INVENTOR
EDWARD C. WALSH
BY Herzig + Walsh
ATTORNEYS

April 21, 1970        E. C. WALSH        3,507,447

ADDING MACHINE ADAPTED TO BE HELD IN ONE HAND

Filed Aug. 5, 1968

April 21, 1970                E. C. WALSH                3,507,447

ADDING MACHINE ADAPTED TO BE HELD IN ONE HAND

Filed Aug. 5, 1968                              7 Sheets-Sheet 5

INVENTOR
EDWARD C. WALSH

BY Herzig + Walsh
ATTORNEYS

April 21, 1970 E. C. WALSH 3,507,447
ADDING MACHINE ADAPTED TO BE HELD IN ONE HAND
Filed Aug. 5, 1968 7 Sheets-Sheet 6

INVENTOR
EDWARD C. WALSH

BY Herzig + Walsh
ATTORNEYS

April 21, 1970  E. C. WALSH  3,507,447
ADDING MACHINE ADAPTED TO BE HELD IN ONE HAND
Filed Aug. 5, 1968  7 Sheets-Sheet 7

INVENTOR
EDWARD C. WALSH
By Herzig + Walsh
ATTORNEYS

United States Patent Office 3,507,447
Patented Apr. 21, 1970

3,507,447
ADDING MACHINE ADAPTED TO BE HELD
IN ONE HAND
Edward C. Walsh, 431 W. 7th St.,
Los Angeles, Calif. 90014
Filed Aug. 5, 1968, Ser. No. 750,272
Int. Cl. G06c 27/00; G06g 1/00
U.S. Cl. 235—77                                                          18 Claims

ABSTRACT OF THE DISCLOSURE

The machine uses a conventional mechanical counter, having an input shaft and reset means. The machine may be manually driven or by a motor. The drive means drives a rotary member, provided with angularly arranged stops, comparable with stop buttons or keys, so that the drive member can be stopped in incremental positions representing tenths of a revolution of the input shaft of the counter and positions representing multiple revolutions of the input shaft from one to 10. While held in one hand, the machine can be operated by the fingers manipulating the drive means and the stop buttons or keys.

SUMMARY OF THE INVENTION

The invention is in the field of adding machines, particularly small machines that can be held in one hand and operated or manipulated in this position. The invention is an improvement over the machines of the type shown in Patents No. 3,160,345 and No. 3,220,645.

The machine of the invention preferably uses a small mechanical counter or odometer, such as are commercially available from various sources. The machine may be driven by a miniature electric motor and battery, or it may be manually operated by means of rack and pinion gear; by means of a threaded stem and drive nut; or by means of a gear segment and pinion gear.

The drive means drives a rotary member which is provided with abutments which cooperate with manually actuatable stop buttons or keys. The abutments are positioned so that the drive member can be stopped by a button or key in positions representing increments of tenths of a revolution of the input shaft of the counter, or positions representing multiple revolutions of the input shaft from one through 10. Thus, using a typical commercial counter, the invention adapts itself ideally to counting of money, that is, counting of increments of pennies, dimes, and dollars. In a preferred form of the invention a counter is used having four counter or digit wheels adapting the machine for counting of money up to $100.00, but of course it can count or add amounts of anything else.

The invention is disclosed herein in various forms, including forms that are manually driven and forms that are driven by an electric motor. The various forms of the invention illustrate different configurations in which the counter is differently positioned or oriented relative to the drive means, the rotary member carrying the abutments and stop members or keys.

In the light of the foregoing, the primary object of the invention is to provide and make possible an adding machine capable of being held in one hand and manipulated. As a corollary to this object it is the intent to make available such a machine which is extremely simple, economical, yet effective and reliable for its purpose.

It is the purpose of the invention to make available a machine of this type, capable of fulfilling many and varied needs for a machine of this type. Counting and adding are, of course, basic functions and many machines are available for performing the function, but they are not inexpensive, small, compact, or economical, and not suited to the needs fulfilled by the herein invention. The particular object is to provide a machine having the characteristics described suitable for use by customers in supermarkets or the like, for adding up the costs of their purchases. Many similar needs are fulfilled by the herein invention.

Further objects and additional advantages of the invention will become apparent following detailed description and annexed drawings wherein:

FIGURE 14 is a sectional view of another form of the invention;

FIGUR 15 is a plan view of the form of the invention shown in FIGURE 14;

Referring to FIGURES 1 through 5, numeral 10 illustrates a typical conventional mechanical counter, having a rectilinear case and reset knob or button 12. The counter may be a typical commercially available counter, such as available from Veeder-Root of Hartford, Conn., or from the ENM Co. of Chicago. Instead of a mechanical counter of this type an odometer may be used of the type used in trip meters of automobile speedometers.

Figures 1, 2, 3, 4, 5:
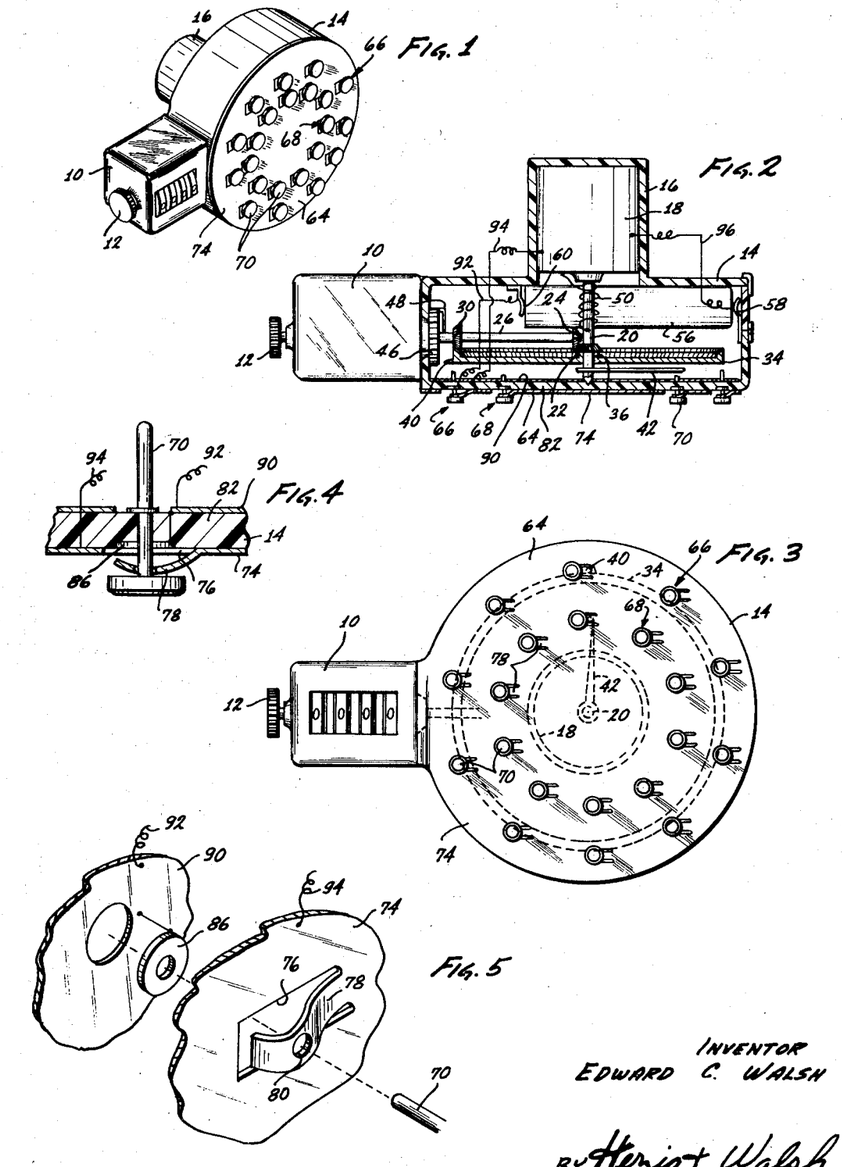
FIGURE 1 is a perspective view of one form of the invention.
FIGURE 2 is a sectional view of the form of the invention of FIGURE 1.
FIGURE 3 is a plan view of the form of the invention of FIGURES 1 and 2.
FIGURE 4 is a detail view illustrating the contacting mechanism of the device of FIGURES 1 to 3.
FIGURE 5 is an exploded perspective view further illustrating the contacting mechanism.

Adjacent to the counter 10 there is mounted the cylindrical housing 14, which may be made of any suitable material, such as plastic or otherwise. The counter 10 and housing 14 are shown in approximately actual size in FIGURES 2 and 3. The size is directly related to the size of the commercially available mechanical counters, and is determined further by limitations related to the capabilities of a human hand to hold and manipulate the device, and further by limitations imposed by the necessity of having the manually actuatable stop members far enough apart from each other so that they can be individually manipulated or actuated. FIGURES 2 and 3 show an optimum size.

At the back of the housing 14 is housing portion 16 in which is a miniature electric motor 18, which is typical of small electric motors of this type that are commercially available. The motor 18 drives shaft 20, on which is a bevel gear 22, meshing with bevel gear 24 on the shaft 26. Shaft 26 is coaxial with the input shaft of the counter 10, and on the shaft is another bevel gear 30 which meshes with a large ring gear 34, having a hub 36 mounted on the shaft 20. The ring gear 34 as shown is on a skirt extending from rotor member 36. This member has one radially extending projection 40, cooperable with the stop buttons or keys as will be described. On the shaft 20 is a radial member or pointer 42 that cooperates with stop members or keys, as will be described.

Numeral 46 designates a ratchet wheel on the shaft of the counter 10, comparable with the pawl 48 driven by the shaft 26. Numeral 50 designates a return torsion spring on the shaft 20. As will be described, the input shaft of the counter 10 may be driven in incremental amounts by the motor 18, the motor being stopped in incremental positions after which return spring 50 returns it to a zero position of the rotor 36. The gear ratio between the gear 30 and the gear 34 is 10 to 1, so that when the rotor 36 makes one revolution the shaft of the counter makes 10 revolutions. Similarly, when the shaft of the counter makes 10 revolutions the member or pointer 42 makes 10 revolutions, the ratio between bevel gears 22 and 24 being 1 to 1.

Numeral 56 designates a battery positioned within the housing 14, the terminals at the ends of the battery engaging spring contacts 58 and 60.

On the front face 64 of the housing 14 there are two circular arrays of operating buttons or keys, which are manually actuatable members, these members being arranged in concentric circles. One of these sets of buttons as designated at 66 is for counting 10's or dimes, and the other as designated at 68 is for counting units or pennies. Each of these buttons as shown has a head and an extending stem, such as shown, for example, at 70 in FIGURE 2, extending through the front face 64 of the housing 14. Carried on the front face of the housing 64 is a metal contacting disc 74, through which the manually actuatable members extend. At the position of each member there is a cut-out as shown at 76 with a tab 78 that bows outwardly as shown, the tab having an aperture as shown at 80 for the stem 70. The front face of the housing 14 is preferably made of insulating material, as shown at 82, and each stem 70 passes through a disc 86 of conduting material fixed in the insulating material 82. On the back side of the front face 64 of the housing is another metal contacting disc 90, through which the stems pass, as may be seen at 70 in FIGURE 4. Discs 74 and 90 are connected to the motor and the battery by wires 92, 94, and 96, as may be seen in FIGURE 2. The tabs 78 form spring members normally urging the buttons or keys outwardly as shown. When a button is pressed, the tab 78 is deformed and pressed inwardly into engagement with the disc 86 to contact it and complete the electrical circuit through the motor and battery for driving the motor.

FIGURE 3 illustrates the array of the actuating buttons to cooperate with the member or pointer 42 and the projection 40 on the rotor 36.

In operation, the device as shown in FIGURE 1 may be held in the right hand, with the thumb in a position to operate the buttons 66 and 68. As mentioned, the outer circle of buttons is for 10's and the inner circle is for units. Preferably, the buttons are marked accordingly. As may be seen, for example, when a purchaser in a supermarket makes a 38¢ purchase he may press the 30¢ button in the outer ring of buttons 66, so that the rotor 36 makes 3/10ths of a revolution, the projection 40 coming into engagement with and being stopped by the stem 70 of the 30¢ button. The pressing of the button energizes the motor for driving the drive means. The counter shaft is driven through three revolutions, and thus 3 appears on the second counter wheel of the counter 10 from the right. Upon release of the button the return spring 50 returns the motor 18 and drive means to the starting position, while the counter remains in the position to which it has been driven, this being allowed by the one-way clutch provided by the pawl 48 and ratchet 46. The operator then presses the 8¢ button of the inner ring of buttons 68 and the pointer 42 is now stopped by the stem of this button at the 8¢ position, the shaft 26 having been driven through 8/10ths of a revolution to cause the number 8 to be put on the units wheel of the counter 10. In this manner amounts of money may be added by manipulation of the machine up to $100.00. After all amounts have been added, the counter 10 may be cleared simply by manipulating the reset button 12.

The contact discs 74 and 90 may, of course, be simply rings of contacting material positioned along the circles established by the buttons 66 and 68.

FIGURES 6, 7, 8, 9 and 10 show another form of the invention, in which similar or corresponding parts are identified by similar reference numerals.

Figures 6, 7, 8, 9, 10:
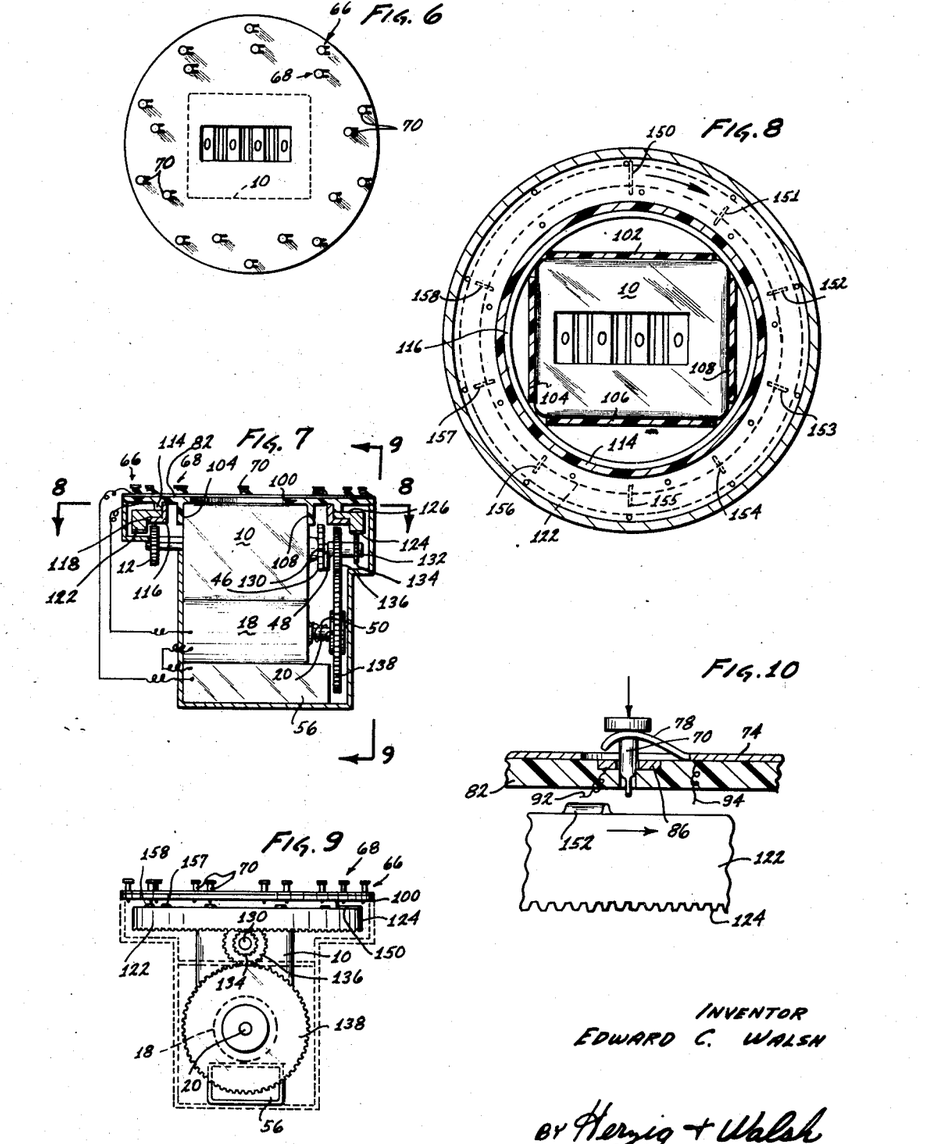
FIGURE 6 is a plan view of a modified form of the invention.
FIGURE 7 is a sectional view of the form of the invention shown in FIGURE 6.
FIGURE 8 is a sectional view taken along the line 8—8 of FIGURE 7.
FIGURE 9 is a view taken along the line 9—9 of FIGURE 7.
FIGURE 10 is a detail sectional view of a part of the machine of FIGURES 7, 8, and 9.

In this form of the invention the motor 10 is positioned within the circles of stop buttons 66 and 68. Numeral 100 designates a circular top plate having inwardly or downwardly extending flanges as shown at 102, 104, 106, and 108, which fit along the side edges of the counter 10 to hold the plate 100 in position. This plate corresponds to and is similar to the front face 64 of the machine of FIGURE 1. It has a downwardly extending circular flange 114 as shown. Numeral 116 designates a ring member that fits inside of the flange 114, having a horizontally extending flange part 118. The rotor that is driven by the motor 18 is designated at 122. It is in the form of a ring gear 124 having a horizontal flange part 126 that rides over the flange 118 and below the flange 114 as shown.

The shaft of the counter 10 is designated at 130. The counter is driven through the pawl 48 and ratchet wheel 46 as in the previous embodiment. Numeral 132 designates a counter or shaft telescoped onto the shaft of the counter, and on this shaft is the gear 134 meshing with the ring gear 124, the ratio being 10 to 1. On the telescoped shaft 132 is a gear 136 meshing with a larger gear 138 on the shaft 20 of the motor 18. The ratio between gears 136 and 138 is not critical. As may be observed, the motor 18 drives the rotor 122 underneath the top plate 100.

In this form of the invention the radial member or pointer 42 is omitted and instead of having this member, abutments or projections are provided on the rotor 122 which serve the purpose that is served by the pointer 42 in the previous embodiment.

On the rotor 122 is one radial projection or abutment as designated at 150, which cooperates with the stems of the 10's buttons 66 as will be described. Instead of the pointer 42 there are provided a series of radial projections or abutments on rotor 122 which cooperate with the stems of the unit buttons 68. These abutments or projections include those designated at 151, 152, 153, 154, 155, 156, 157, and 158. The buttons 66 are positioned substantially 36° apart to establish increments of rotation of the rotor 122 in tenths representing multiples of revolutions of the shaft of counter 10 from 1 to 10. The units buttons 68 are positioned so that their stems cooperate with the projections 151 through 158, as well as the projections 150 cooperating with the first button 68. These buttons are positioned to cooperate with individual ones of the radial projections or abutments, so that these buttons will control incremental movements of the counter shaft in tenths of a revolution. That is, the first units button 68 is positioned so that when it is operated it stops the rotor 122 by cooperating with the abutment 150 to stop rotation after 1/10th of a revolution of the shaft of counter 10, that is 1/100th of a revolution of rotor 122, that is, 3.6° of rotation. Thus, whereas the series of buttons 66 are substantially 36° apart, the buttons 68 are positioned at multiples of 3.6° (1/100th of a revolution) from the 36° positions as illustrated in FIGURE 8. Thus, the number 2 units button 68 will cooperate with the abutment 151 to stop rotation of the rotor 122 after 7.2° of rotation, that is, 2/10ths of a revolution of the counter shaft or 2/100ths of a revolution of the rotor 122.

The contacting means associated with the buttons 66 and 68 is like that of the previous embodiment, the connections to the motor 18 and battery 56 being the same.

From the foregoing, those skilled in the art will understand the operation of the present form of the invention. The device is held in one hand with the thumb in a position to operate the buttons 66 and 68. The buttons are operated as in the previous embodiment to energize the motor buttons being pressed, in accordance with the units and 10's numbers to be added. After each actuation of a button, the device returns to a zero position by way of the return spring 50. The start or zero position can of course be established by a stop.

The housing for the parts will be larger than the cross-sectional size of the counter 10 and motor 18, except for an enlargement to accommodate the gear 138, so that the device can be conveniently held in one hand. As in the previous embodiment, the device is preferably made of a minimum size, wherein the buttons 66 and 68 can be arranged so that they are far enough apart to readily accommodate individual manipulation. Thus, the overall size of the device is such that it can be conveniently carried in a purse, pocket, or briefcase.

Figure 11:
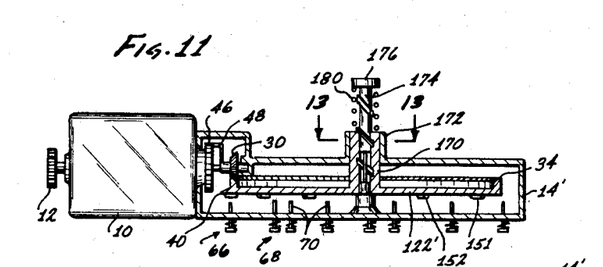
FIGURE 11 is a sectional view of another form of the invention.
Figure 12:
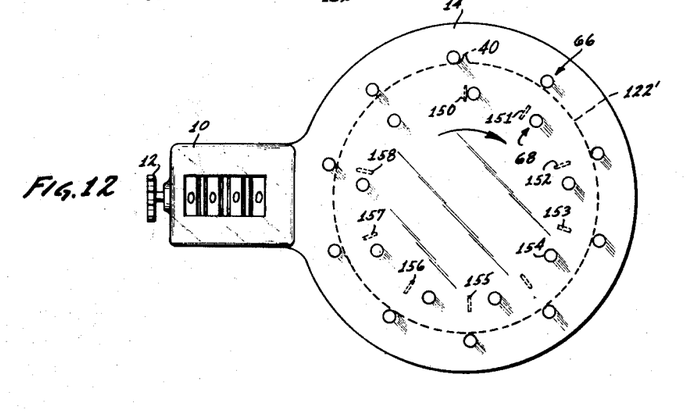
FIGURE 12 is a plan view of the form of the invention shown in FIGURE 11.
Figure 13:
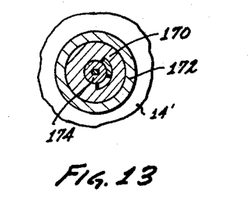
FIGURE 13 is a sectional view taken along the line 13—13 of FIGURE 11.

FIGURES 11, 12, and 13 show another form of the invention which embodies some of the characteristics of the form of the invention shown in FIGURES 1 to 5, and some of the characteristics of the embodiment of FIGURES 6 to 10. The corresponding parts are similarly or correspondingly identified by reference numerals.

The form of the invention shown in these figures is manually driven. The device is similar to that of FIGURES 1 through 5 with respect to the positioning of the counter 10 and housing 14'. The rotor 122' has abutments which are like those of the form of the invention shown in FIGURES 6 to 10 and therefore they need not be described again in detail. The drive embodies ring gear 34 which drives gear 30 which drives the counter shaft through the pawl 48 and ratchet 46.

The rotor 122' has a hub 170 journalled in a hub 172 at the back of housing 14'. Numeral 174 designates a threaded stem and lead screw having a button or knob 176 at its end. Hub 170 is internally threaded to receive the stem or lead screw 174 for rotating it. Encircling the stem 174 is a coil return spring 180.

As previously pointed out, the array of buttons 66 and 68 and the cooperating abutments on the rotor 122' correspond to those of FIGURES 6 through 10. The operation of the present embodiment will be readily understood by those skilled in the art. The rotor 122' is rotated by merely manually pushing the button 176 with one finger of one hand. This rotates the rotor 122' and correspondingly the counter 10 in an amount determined by one of the buttons 66 or 68 that is pressed. The corresponding number appears on the counter, and upon releasing the button 176 the return spring 180 returns the drive mechanism to the start or zero position. This form of the invention is held in the hand similar to that of FIGURES 1 to 5, except that one finger is positioned behind the housing 14' for operating the stem 176.

Figures 14, 15:
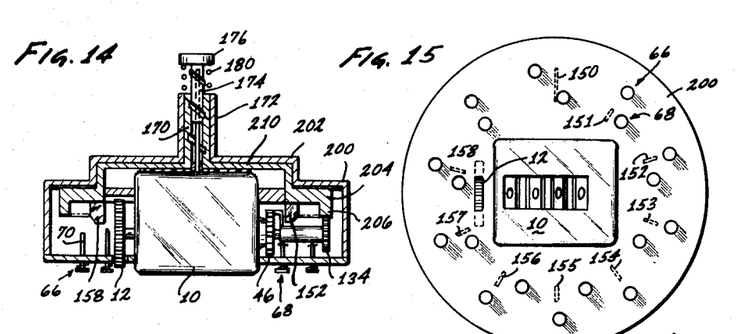

FIGURES 14 and 15 show another form of the invention, wherein the counter is within the rotor as in FIGURES 6 to 10, the device being manually driven in the manner of that of FIGURES 11, 12, and 13. Corresponding or similar parts are correspondingly identified by reference numerals.

In FIGURES 14 and 15 the housing is designated at 200, and would be configurated to enclose the parts oriented as they are shown. The back part of the housing 200 has an extending part 202 of smaller diameter. The rotor is designated at 204, having a skirt part 206 which is a ring gear meshing with the gear 134 in a 10 to 1 ratio. The rotor 204 has a central circular offset part 210 fitting within the part 202 of the housing 200. The buttons 66 and 68 cooperate with arrays of abutments on the rotor 204 which are like those as described in connection with the form of the invention shown in FIGURES 6 to 10, so that they do not have to be described again in detail.

The operation of the form of the invention shown in FIGURES 14 and 15 will be obvious to those skilled in the art, it being similar to that of the form of the invention shown in FIGURES 11 to 13. The difference is in the arrangement of parts, whereby the device is made even more compact.

Figure 16:
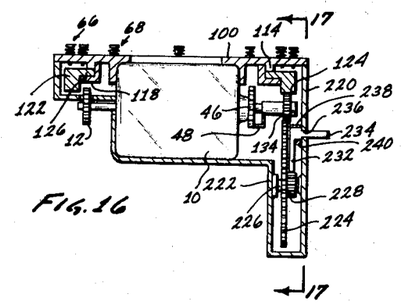
FIGURE 16 is a sectional view of another form of the invention.
Figure 17:
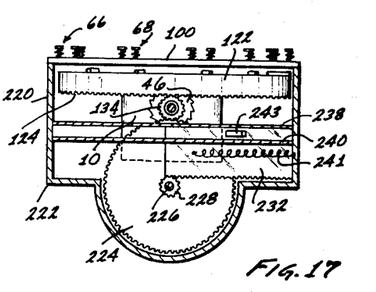
FIGURE 17 is a view taken along the line 17—17 of FIGURE 16.

FIGURES 16 and 17 show another form of the invention, wherein the device is operated by a gear rack. This form of the invention is like that of FIGURES 6 to 10, except that instead of being motorized it is driven by the gear rack. In these figures the housing is designated at 220, being configurated to enclose the counter and the driving mechanism. The housing 220 has an enlarged part as designated at 222, which encloses a relatively large gear 224 on a shaft 226 and on which is a small gear 228. Cooperating with the gear 228 is the rack 232 which is angular in cross-section as shown, having an angularly extending handle part 234 that extends outwardly through a slot 236 in the housing 220. The rack is guided by guide members 238 and 240 inside of the housing 220. The rack 232 drives the gears 228 and 224, the gear 224 meshing with the gear 134 which drives the counter. The arrangement of buttons 66 and 68, and abutments on the rotor 122 is like that of the form of the invention shown in FIGURES 6 to 10 and need not be described again in detail.

The operation of the present form of the invention will be readily understood by those skilled in the art. It is like that of previous forms of the invention described, except that the device is held in one hand so that the operator can manipulate the handle 234 to pull it in one direction. The thumb operates the buttons 66 and 68, the rack being returned by the return spring 241.

FIGURES 18 to 21 show another form of the invention having another configuration in which the device is elongated but otherwise more compact. In this form of the invention the housing is designated at 250, having an enlarged part adjacent to the counter to house the gearing and an extending tubular part 252 which houses the stop mechanism. Similar or corresponding parts are identified by similar and/or corresponding reference numerals.

Figure 18:
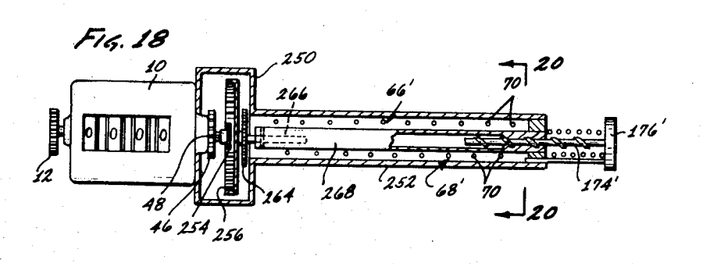
FIGURE 18 is a sectional view of another form of the invention.
Figure 19:
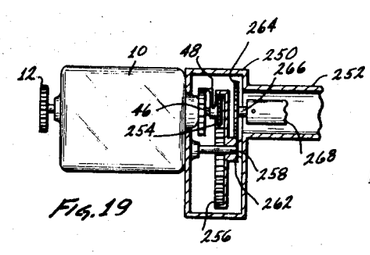
FIGURE 19 is a partial sectional view similar to FIGURE 18.
Figure 20:
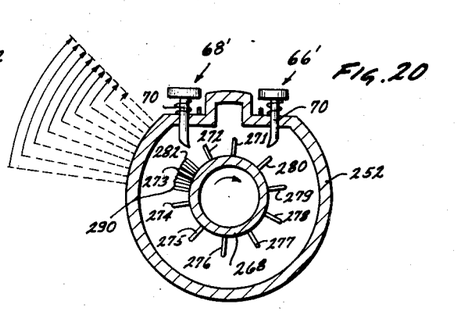
FIGURE 20 is an enlarged sectional view taken along the line 20—20 of FIGURE 18.
Figure 21:
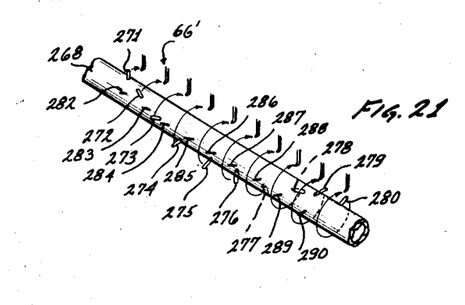
FIGURE 21 is a perspective view of the rotary member used in the form of the invention shown in FIGURES 18, 19, and 20.

The pawl 48 is driven by the gear 254 which is in turn driven by a relatively large internal gear 256 on a shaft 258 journalled within the housing 250 as shown. The hub of the gear 256 forms a small gear 262 which is driven by a gear 264 from a shaft 266 axially connected to a tubular stem 268 within the part 252. The tubular drive stem is shown more in detail in 268. As may be seen, it is rotated by a drive mechanism like that of FIGURES 11 and 14, comprising the button 176' and the threaded stem or lead screw 174'. In this form of the invention the abutments that cooperate with the buttons 66' and 68' are arranged in axially spaced relationship along the tubular stem 268. The buttons 66' are arranged in an axially spaced relationship as are the buttons 68'. A series of 10 radial projections are provided on the stem 268 which are axially spaced along the stem and which are substantially 36° apart. These projections are shown in FIGURE 21 and designated at 271 through 280. These projections cooperate with the buttons 66' which have a similar axial spacing. Thus, it can be seen that pressing any one of the buttons 66' causes it to engage its corresponding projection on the stem 268 to stop rotation of the stem 268 at a corresponding number of tenths of a revolution. The gear ratio of the gear train within the housing 250 is such that one revolution of the stem 268 produces 10 revolutions of the counter shaft. Only a limited axial movement of the button 176' is necessary to produce one revolution of the stem 268, the amount of axial movement of the button 176' to produce one revolution not being critical.

A similar set of projections is provided axially spaced along the stem 268 to provide for the units movement, that is, movements of the shaft of the counter 10 representing tenths of a revolution of this shaft, or hundredths of a revolution of the shaft or stem 268. These projections are similarly axially spaced along the stem 268 but are staggered relative to the projections 271 through 280. These projections are designated by the numerals 282 through 290. These projections are spaced substantially 3.6° apart in the angular direction. They cooperate with the buttons 68' in the same manner as the buttons 66' cooperate with the projections 271 through 280.

From the foregoing, those skilled in the art will understand the operation of this form of the invention. The device is manually operated by pushing the button 176' with one finger while the device is held in one hand with the thumb in a position to operate the buttons 66' and 68'. One revolution manually imparted to the stem 268 will produce 10 revolutions of the counter shaft under the control of the buttons. For inserting units, that is, pennies, the buttons 68' are operated, and as may be seen, they cooperate with the projections 282 through 290, so that the counter shaft is operated through corresponding tenths of a revolution, that is, hundredths of a revolution of the stem 268. Similarly, the operation using the buttons 66' controls tenths of a revolution of the stem 268, and correspondingly multiple revolutions of the counter shaft from 1 through 10.

Figure 22:
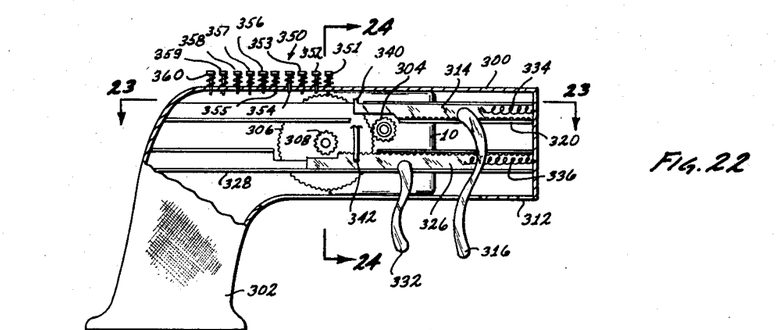
FIGURE 22 is a sectional view of another form of the invention.
Figure 23:
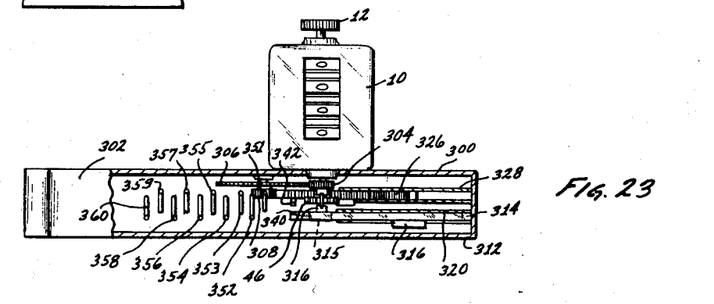
FIGURE 23 is a view taken along the line 23—23 of FIGURE 22.
Figure 24:
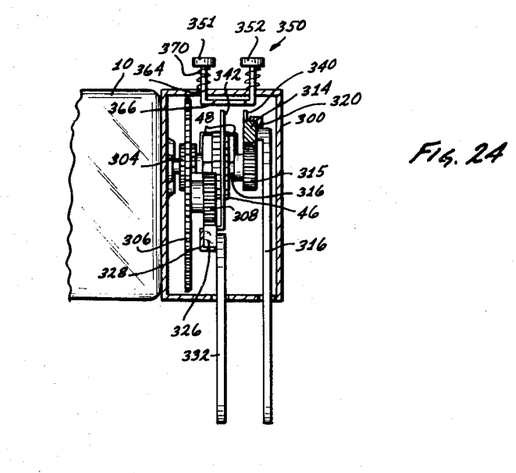
FIGURE 24 is a sectional view taken along the line 24—24 of FIGURE 22.

FIGURES 22, 23, and 24 show another form of the invention. The device is formed with a pistol grip and the drive means comprises two racks operated by triggers. The housing in FIGURES 22, 23 and 24 is designated at 300, having a pistol grip part 302. On the shaft of the counter 10 is a small gear 304 which meshes with the larger gear 306 journalled within the housing on a shaft having on it a small gear 308. The housing 300 has a barrel part 312. In this part is a rack 314 operable by a manually engageable trigger 316, the rack being guided in the guide track 320 formed within the housing 300. The rack 314 is directly engageable with the gear 304. The relative size of the gear 304 with respect to the length of the rack 314 is such that a complete traverse of the rack will drive the gear 304 and counter 10 through one revolution.

The rack 314 is like a similar rack 326 with its teeth on the upper side to be engageable with the gear 308. This rack is guided in a similar trackway 328 in the housing 300. The ratio between the gears 306, 308, and 304 and the length of the rack 326 is such that a complete traverse of the rack 326 will produce 10 revolutions of the gear 304 and the counter shaft. The rack 326 is operable by a similar manual trigger 332. Return spring 334 is provided for rack 314 and the return spring 336 for rack 326. In this form of the invention the rack 314 drives gear 315 which is on the shaft 316 of the counter with the pawl 48 and ratchet wheel 46 between gear 315 and gear 304.

As may be seen in FIGURE 24, upstanding from the rack 314 is a stop member 340, and upstanding from the rack 326 is a stop member 342. A single set of manually actuatable members or buttons is provided as designated at 350. In this form of the invention buttons 350 are staggered in relationship to each other, as may be seen in FIGURE 3, the buttons being designated at 351 through 360. As may be seen in FIGURE 24, the button 351 has a stem 364 with an angular foot part 366 extending horizontally, so that it can cooperate with both the projections 340 and 342 on the racks 314 and 326. All of the buttons are of the same construction, except that in each row there are horizontally extending parts 366 extending inwardly from the buttons. A return spring 370 is provided with the button 351, all of the buttons, as stated, being of similar construction.

From the foregoing, those skilled in the art will appreciate and understand the operation of this form of the invention. It may be held in one hand like a pistol, the pistol grip being grasped with the index finger in a position to operate the two triggers 316 and 332. For counting units, or pennies, trigger 316 is pulled and the appropriate button 350 is pressed for the unit or amount of pennies to be added, and the movement of the rack 314 is stopped correspondingly. Similarly, to add 10's or dimes the trigger 332 is pulled operating the rack 326 and corresponding revolutions are imparted to the counter shaft in multiples from 1 through 10. As may be seen, each of the buttons 350 is positioned to stop both racks; however, of course, only one rack is operated at a time.

FIGURES 25 to 28 show another form of the invention, featuring a different array of the stop buttons. In FIGURES 25 to 28 the housing is designated at 300'. It is a generally cylindrical housing having an axis not coaxial with but parallel to the axis of the counter 10. It has a portion 302' of smaller diameter which houses the counter 10 and motor 18. Within the housing 300' is a rotor 304' mounted on shaft 306' with a return spring 308', the shaft being journalled in a bearing 310' within housing 300'. Rotor 304' has a hub 312' and an intermediate web 314' and extending parts 316' and 318' which extend from the web 314'. The part or skirt 316' forms an internal gear. The motor shaft is designated at 320', and on it is a gear 322' which drives the ring gear 316'. This gear drives a gear 326' on a shaft 328' and gear 326' drives a gear 330' on the motor shaft through the pawl 48 and ratchet wheel 46.

Figure 27:
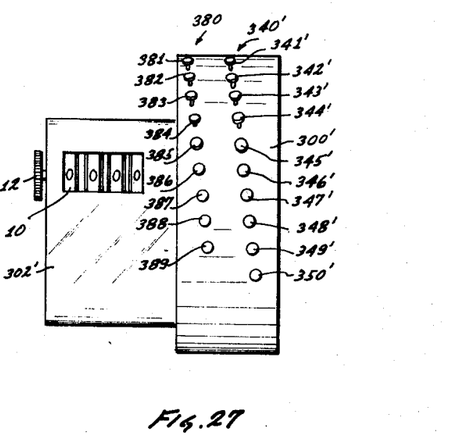
FIGURE 27 is a front view of the form of the invention of FIGURES 25 and 26.
Figure 28:
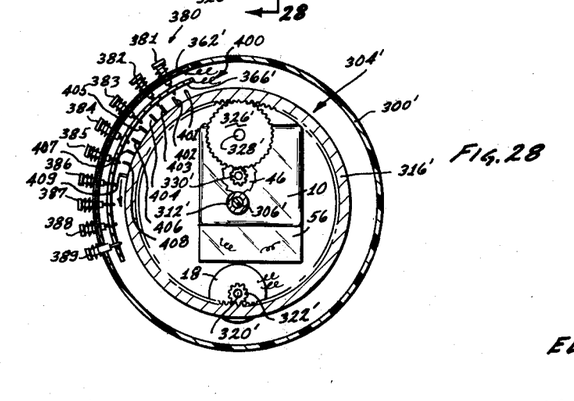
FIGURE 28 is a sectional view taken along the line 28—28 of FIGURE 26.
Figure 29:
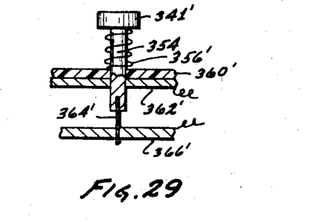
FIGURE 29 is a detail view of the stop members of FIGURES 25 to 28.

In this form of the invention the gear train is arranged so that there is a 10 to 1 ratio as between the rotor 304' and the counter shaft. Two sets of 10 control buttons are provided which are angularly spaced throughout a part of the circumference of the housing 300' and which are spaced axially relative to each other a small amount, as shown in FIGURE 27. Of the ten buttons, those units or 10's are designated at 340', the buttons being numbered from 341' through 350'. The button 341' is shown in FIGURE 29 as having a stem 354' and a return spring 356'. It extends through an insulating strip 360' on the outside of the housing 300', and a contact strip 362' on the inside of the housing the stem 354' being conducting. The stem 354' has an extending stem part 364' of insulating material which extends through an arcuate contact strip 366', contact being made for energizing the motor 18 when the stem part 354' engages the strip 366'. All buttons are of similar construction.

Figure 25:
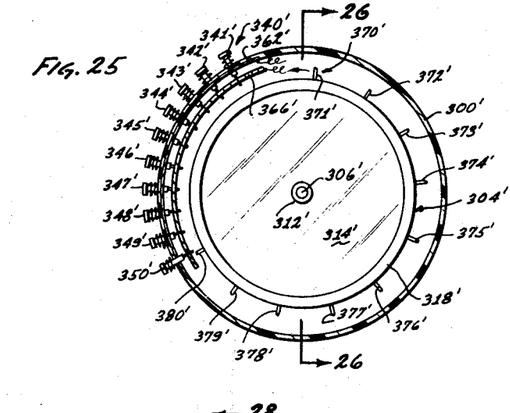
FIGURE 25 is a sectional view of another form of the invention.
Figure 26:
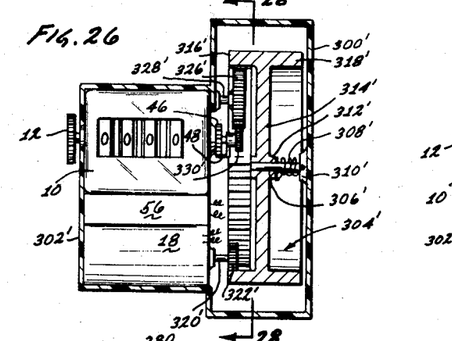
FIGURE 26 is a sectional view taken along the line 26—26 of FIGURE 25.

Provided on the rotor 304' are projections desginated at 370' that cooperate with the buttons 340'. In the form of the invention shown, the buttons 340' are arranged over a 90° extent of the circumference of the housing 300'. The projections 370' are identified by the numerals 371' through 380'. The first projection 371' is at the start position substantially 36° from the first button 341', so that the pressing of this button produces 1/10th of a revolution of the rotor 304' and a full revolution of the counter shaft. The remaining projections 372' through 381' are spaced to accommodate the positions of the buttons 340' which are substantially 9° apart, being spaced over a 90° extent of the circumference of the housing 300. Thus, the projections 372', instead of being 36° from the projection 371', is advanced 9° toward it in a counter-clockwise direction to accommodate the spacing between the buttons 341' and 342'. Successive buttons 373', etc. are advanced in a counter-clockwise direction in multiples of 9°, corresponding to the successive spacing between the buttons 341', 342', etc. Thus, it may be seen that the arrangement makes it possible to have an array of buttons not spaced entirely around the circumference of the circular member, but rather compressed into an angular extent of less than a complete circumference, for example, 90° in this exemplary form of the invention. The projections 370' are spaced axially in the same amounts as the buttons 340'. In other words, each projection cooperates with a particular button.

The units or pennies buttons are designated at 380 and are identified by the numerals 381 through 389, and they are similarly spaced axially. These buttons cooperate with a similar set of projections 400 identified by the numerals 401 through 409. Each projection is in a position relative to the start position, such that it will move through a multiple of substantially 3.6° in order to engage its respective stop button. That is, each of the stop buttons will produce an increment of hundredths of a revolution of the rotor 304' from 1 through 10.

FIGURES 30, 31, 32, and 33 show another form of the invention, wherein the counter is operated by a gear segment. The housing is designated at 420, being in the form of a section of a cylinder as shown. On the shaft of the motor is a gear 422 which meshes with a larger gear 424, on the shaft of which is a small gear 426. The gear 426 is positioned to be engaged by a gear segment 430 which moves in an arcuate guideway 432 within the housing 420. It is operable by a radial member 434, having an offset part 436 as shown, the part 438 being attached to the gear segment. Radial member 434 has a hub 440 mounted on the shaft 442. Numeral 446 designates a return spring. The radial member 434 operates in slot 450 in a part of the housing 420.

Figure 30:
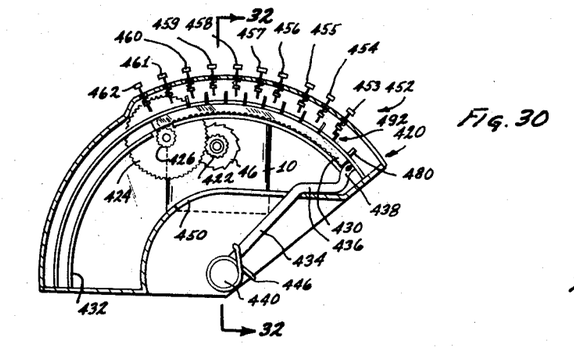
FIGURE 30 is a sectional view of another form of the invention.
Figure 31:
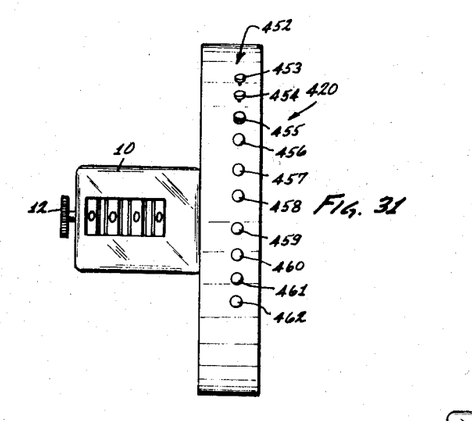
FIGURE 31 is a front view of the form of the invention shown in FIGURE 30.
Figure 32:
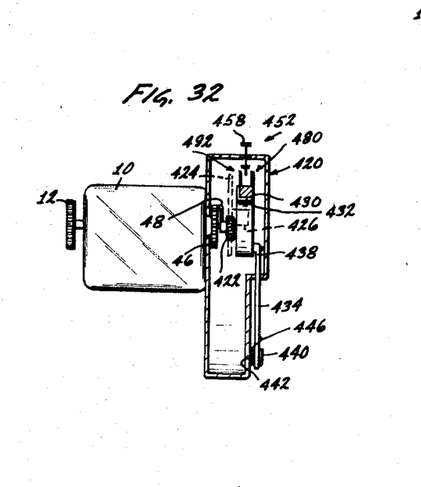
FIGURE 32 is a sectional view taken along the line 32—32 of FIGURE 30.

In this form of the invention a single set of buttons is provided even though there is only one gear segment. The buttons are designated at 452, the individual buttons being identified by the numerals 453 through 462. The buttons have stems as shown at 464 which extend radially through apertures in an arcuate part of the housing 420, as shown at 466. The stem 464 has an intermediate part 468 pivotally mounted on the pin 470, transversely mounted in an aperture 472 in the part 466 of the housing.

Figure 33:
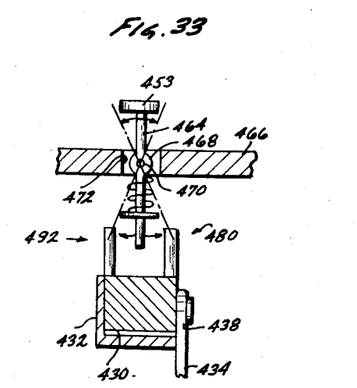
FIGURE 33 is a detail view illustrating one of the stop memebrs of the form of the invention shown in FIGURES 30, 31, and 32.

The gear segment 430 has radially extending projection 480, as may be seen in FIGURE 33, which cooperates with the stop buttons to establish the 10's or dime positions desired. The gear ratio provided is such that the length of the gear segment will produce 10 revolutions of the counter shaft when it is moved through 90°. Other relationships could be provided. Each button such as 453 is rotatable about the pivot, as shown in FIGURE 33. On the gear segment is a series of radial projections as designated at 492 angularly spaced to establish the units or penny positions of stopping the gear segment 430, which are positions for increments of tenths of a revolution of the counter shaft.

The operation of this embodiment will be readily understood by those skilled in the art. For counting units or pennies the buttons 452 are manipulated laterally so that the stems cooperate with the projections 492. There is one projection cooperable with the stem of each button positioned to provide for successive counter shaft movements of 1/10th of a revolution through successive increments of tenths to a full revolution. For counting 10's or dimes the buttons 452 are manipulated laterally the other way so that they cooperate with the single projection 480 to establish incremental angular movements of the gear segment 430, corresponding to multiple counter shaft revolutions of from one through 10.

Figure 34:
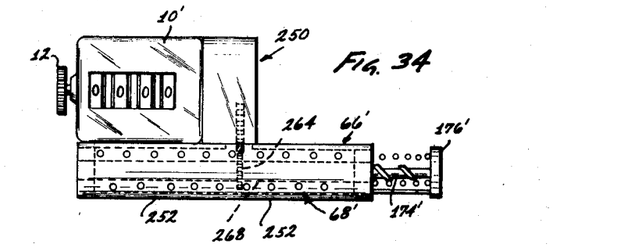
FIGURE 34 is a view of another form of the invention.

FIGURE 34 is a form of the invention like FIGURES 18–21, but uses an odometer 10'. The arrangement is like FIGURES 18–21 but the housing 252 and array of buttons overlaps the counter (odometer) to shorten the overall length. The gear drive is from an intermediate point of stem 268.

From the foregoing, those skilled in the art will readily understand and appreciate the nature and construction of the invention and the manner in which it achieves and realizes all of the objects as stated in the foregoing, and the advantages that are apparent from the detailed description.

The foregoing disclosure is representative of preferred forms of the invention and is to be interpreted in an illustrative rather than a limiting sense, the invention to be accorded the full scope of the claims appended hereto.

What is claimed is:

1. An adding machine comprising a mechanical counter having digit wheels, transfer means between adjacent wheels, and an input axis, means for imparting inputs in increments of tenths of a revolution about said input axis and increments of one of more full revolutions about the input axis, said means comprising drive means for imparting rotation about the input axis, and manually actuatable stop members positionally arranged for stopping said drive means in positions of tenths of a revolution of the input axis and in positions of one through ten revolutions of the input axis.

2. A machine as in claim 1 wherein said drive means comprising a rotary member, said stop members being circularly arranged relative thereto.

3. A machine as in claim 2 comprising a second rotary member, said drive means being constructed to rotate said rotary members in a ratio of 10 to 1 and said stop members comprising a set of members cooperable with each rotary member.

4. A machine as in claim 2 wherein said rotary member carries abutments cooperable with the stop members, said abutments being positioned for stopping the drive means in positions of tenths of a revolution of the input axis and in positions of from one through ten revolutions of the input axis.

5. A machine as in claim 2 including a motor driving said drive means and contacts controlling the motor actuatable by the manually actuatable members.

6. A machine as in claim 2 wherein the counter is positioned with its axis normal to the axis of said rotary member.

7. A machine as in claim 2 wherein said drive means is constructed to be manually actuated.

8. A machine as in claim 7 comprising a manually actuated threaded stem coaxial with said rotary member.

9. A machine as in claim 2 wherein said counter is positioned within said rotary member.

10. A machine as in claim 9 wherein drive means comprises a manually actuatable threaded stem coaxial with said rotary member.

11. A machine as in claim 9 including a motor for said drive means and contacts controlling said motor actuatable by said manual members.

12. A machine as in claim 1 comprising a gear rack, said stop members being positioned along said rack.

13. A machine as in claim 1, wherein said drive means comprises two gear racks and said stop members comprise a set of stop members positioned to cooperate with both racks.

14. A machine as in claim 4, wherein said abutments comprise radial projections spaced axially along the rotary member.

15. A machine as in claim 14, wherein the stop members are arranged over a part of the circumference of the rotary member to cooperate with the radial projections.

16. A machine as in claim 14, wherein the rotary member is elongated, the stop member being aligned axially along the rotary member to cooperate with the radial projections.

17. A machine as in claim 1, wherein said drive means comprises a gear segment, said stop means being positioned along the path of travel of the gear segment, the said segment having abutments for stopping the drive means in positions of tenths of a revolution of the input axis and in positions of from one through ten revolutions of the input axis.

18. A machine as in claim 17, wherein said abutments comprise one set for tenths of a revolution and one set for multiple revolutions, said stop members being constructed to be individually cooperable with both sets.

References Cited

UNITED STATES PATENTS

| | | | |
|---|---|---|---|
| 2,564,450 | 8/1951 | Rupp | 235—114 |
| 3,160,345 | 12/1964 | Walsh | 235—78 |
| 3,380,654 | 4/1968 | Williams | 235—143 |

STEPHEN J. TOMSKY, Primary Examiner

U.S. Cl. X.R.

235—1, 62